(12) United States Patent
Li

(10) Patent No.: US 8,393,908 B2
(45) Date of Patent: Mar. 12, 2013

(54) CARD EDGE CONNECTOR ASSEMBLY WITH ROTATABLE CARD EJECTING DEVICE

(75) Inventor: Hua Li, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 310 days.

(21) Appl. No.: 12/770,692

(22) Filed: Apr. 29, 2010

(65) Prior Publication Data

US 2010/0279531 A1    Nov. 4, 2010

(51) Int. Cl.
*H01R 13/62* (2006.01)

(52) U.S. Cl. ........................................................ 439/159

(58) Field of Classification Search .................. 439/152, 439/155, 157, 160, 159
See application file for complete search history.

(56) References Cited

U.S. PATENT DOCUMENTS

| 5,468,156 | A  | * | 11/1995 | Flinchbaugh et al. | 439/157 |
| 6,431,890 | B1 | * | 8/2002  | Li et al.          | 439/160 |
| 6,814,597 | B1 | * | 11/2004 | Kao                | 439/159 |
| 7,252,523 | B1 | * | 8/2007  | Pennypacker et al. | 439/160 |
| 7,264,491 | B2 |   | 9/2007  | McBroom et al.     |         |
| 7,859,850 | B2 | * | 12/2010 | Chan et al.        | 361/737 |

* cited by examiner

*Primary Examiner* — Tulsidas C Patel
*Assistant Examiner* — Travis Chambers
(74) *Attorney, Agent, or Firm* — Wei Te Chung; Ming Chieh Chang

(57) ABSTRACT

A card edge connector includes an insulative housing defining a central slot expanding along a transverse direction with a plurality of contacts disposed therein, and a pair of side arms disposed at opposite ends thereof. A pair of card ejecting devices are assembled on the side arms, each comprising an ejecting member attached to the side arm and an operation member which can rotate in a plane perpendicular to the card edge connector. The ejecting member comprises a block portion projecting into the central slot and moving along a front-to-rear direction perpendicular to the transverse direction by the urging of the operation member.

17 Claims, 8 Drawing Sheets

CARD EDGE CONNECTOR ASSEMBLY WITH ROTATABLE CARD EJECTING DEVICE

BACKGROUND OF THE INVENTION

1. Field of the Invention

The present invention relates to a card edge connector, and more particularly to a card edge connector with a rotatable card ejecting device for ejecting a memory module received in the card edge connector.

2. Description of the Related Art

U.S. Pat. No. 7,264,491 issued to McBroom et al. on Sep. 4, 2007 discloses a card edge connector for receiving a memory module therein. The card edge connector comprises an elongated insulative housing, a plurality of contacts mounted in the insulative housing and a card ejecting device. The insulative housing defines a central slot expanding along a transverse direction and a pair of side arms disposed at opposite ends thereof. The card ejecting device is assembled on the side arms and rotated about the side arms in the transverse direction when the memory module needs to be released from the central slot, therefore the card ejecting device may take up a large space at opposite ends of the insulative housing. Obviously, an improved card edge connector is highly desired to overcome the aforementioned problem.

SUMMARY OF THE INVENTION

Accordingly, an object of the present invention is to provide a card edge connector meet the miniaturization trend.

In order to achieve the object set forth, a card edge connector includes an insulative housing defining a central slot expanding along a transverse direction with a plurality of contacts disposed therein, and a pair of side arms disposed at opposite ends thereof. A pair of card ejecting devices are assembled on the side arms, each comprising an ejecting member attached to the side arm and an operation member which can rotate in a plane perpendicular to the card edge connector. The ejecting member comprises a block portion projecting into the central slot and moving along a front-to-rear direction perpendicular to the transverse direction by the urging of the operation member.

In order to achieve the object set forth, a card edge connector includes an insulative housing defining a central slot expanding along a transverse direction with a plurality of contacts disposed therein, and a pair of side arms disposed at opposite ends thereof. A card ejecting device comprises an ejecting member having a blocking portion adjacent to the central slot and a bending portion far away from the central slot, and an operation member having an operation portion and a cam portion extending from the operation portion and located behind the bending portion in a front-to-rear direction perpendicular to the transverse direction. The cam portion urges the bending portion to move along said front-to-rear direction so as to drive the blocking portion moving away from the central slot.

Other objects, advantages and novel features of the invention will become more apparent from the following detailed description of the present embodiment when taken in conjunction with the accompanying drawings.

DETAILED DESCRIPTION OF THE INVENTION

Figure 1:
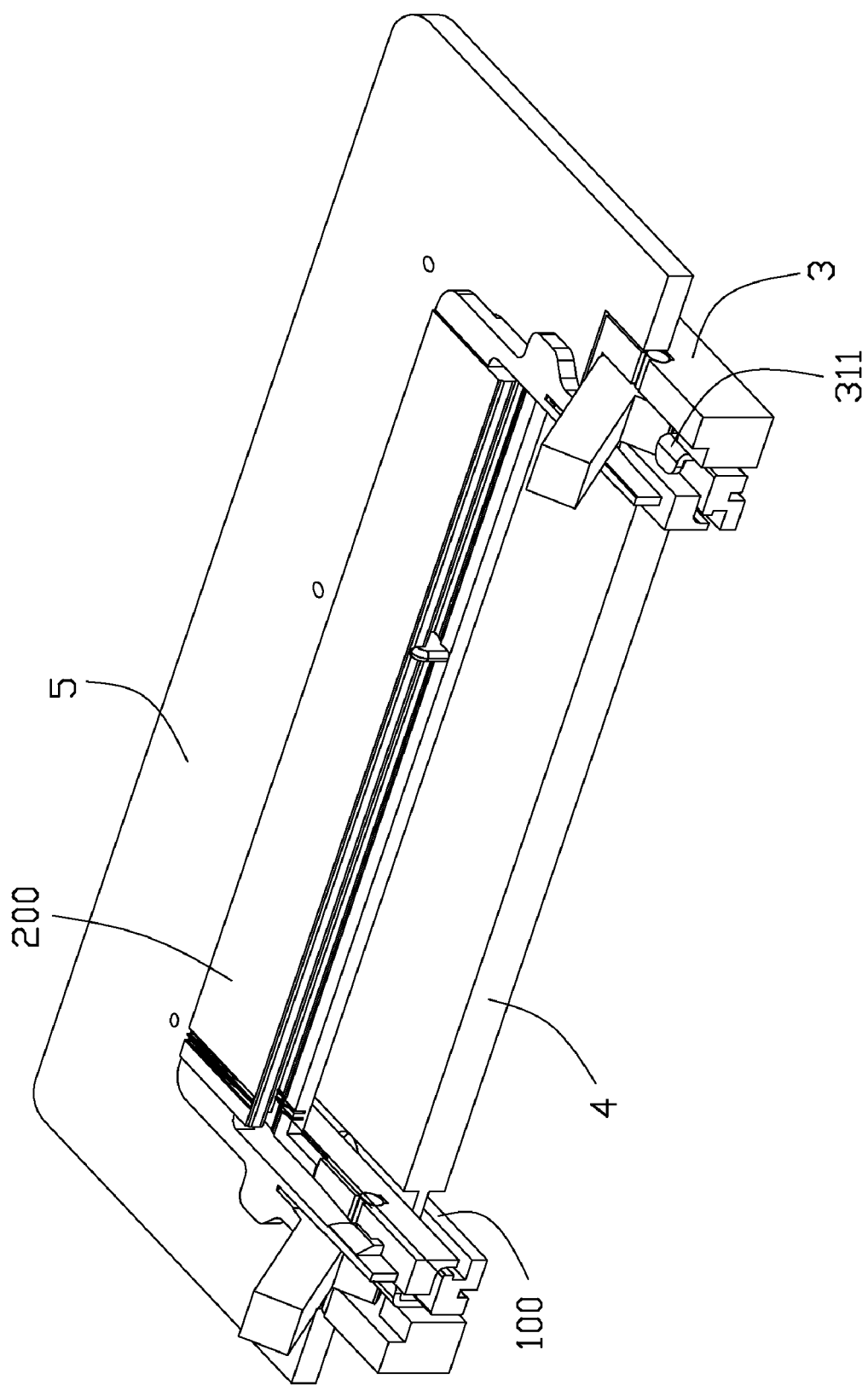
FIG. 1 is a perspective view of a card edge connector in accordance with the present invention, on which a second card edge connector is stacked.
Figure 2:
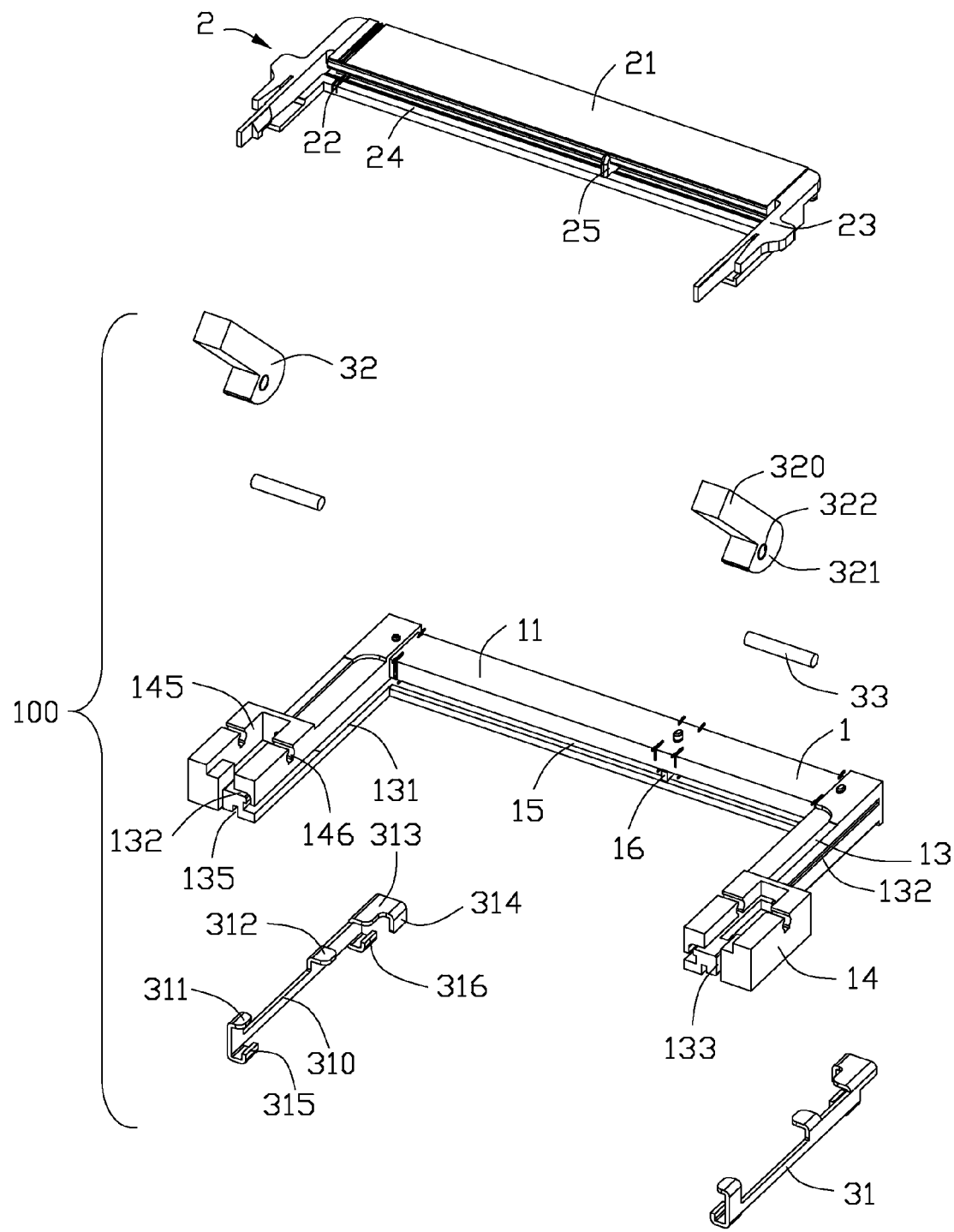
FIG. 2 is an exploded perspective view of the card edge connector and the second card edge connector shown in FIG. 1.
Figure 3:
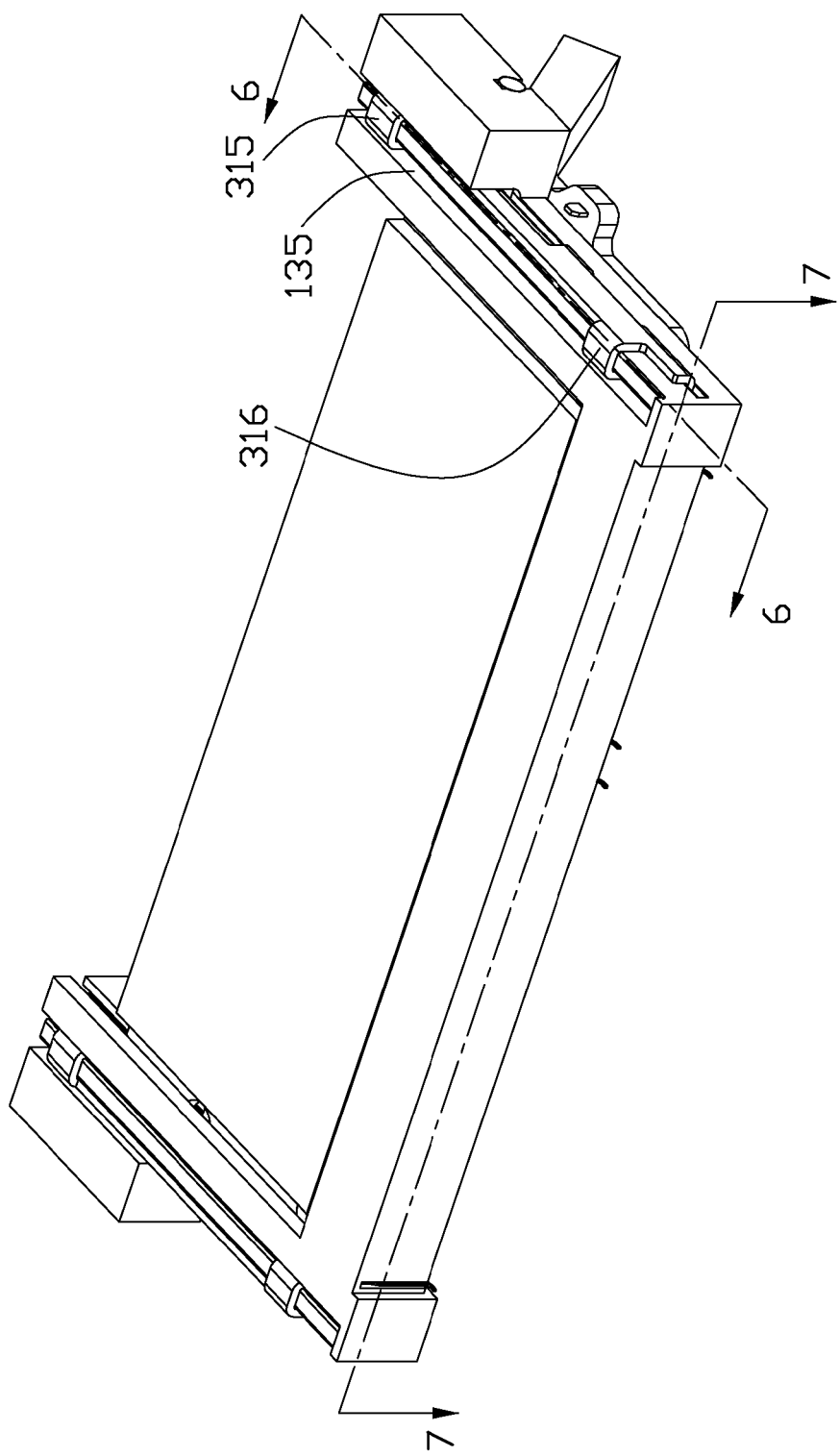
FIG. 3 is another perspective view of the card edge connector stacked with the second card edge connector shown in FIG. 1.

Reference will now be made to the drawing figures to describe a preferred embodiment of the present invention in detail. Referring to FIGS. 1 and 2, a first card edge connector 100 made according to the preferred embodiment of the present invention is provided and comprises an insulative housing 1 with a plurality of contacts mounted therein and a pair of card ejecting device 3. The first card edge connector 100 is assembled under a printed circuit board 5 for receiving a memory module therein and electrically connecting the memory module to the printed circuit board 5. A second card edge connector 200 is provided and mounted on the printed circuit board 5 above the first card edge connector 100. The memory module is inserted into the first card edge connector 100 in a horizontal manner, while the memory module is inserted into the second card edge connector 200 in a slant-wise manner.

Referring to FIG. 2, the second card edge connector 200 comprises an insulative housing 2 and a plurality of contacts 22 mounted in the insulative housing 2. The insulative housing 2 comprises a base portion 21 defining a central slot 24 expanding along a transverse direction and a pair of side arms 23 disposed at opposite ends thereof. A key 25 is formed in the central slot for anti-mismating of the memory module. A pair of posts 26 are formed on a bottom face of the insulative housing 2 for positioning the second card edge connector 200 on the printed circuit board 5.

The insulative housing 1 comprises a base portion 11 defining a central slot 15 expanding along a transverse direction and a pair of side arms 13 disposed at opposite ends thereof. A key 16 is formed in the central slot 15 for anti-mismating of the memory module. The side arms 13 together with the base portion 11 define a receiving space for receiving the memory module. Each side arm 13 forms a holding section 14 at a distal end thereof and protruding outwardly from a lateral side thereof. The holding section 14 also projects upwardly from the side arm 13 so as to form a step configuration. A receiving room 145 is defined along a rear-to-front direction on the holding section 14 and opens forwardly and upwardly. A channel 146 is also defined on the holding section 14 and extends across the receiving room 145 along the transverse direction. A guiding passageway 131 is defined at an inner side of each side arm 13 and extends along the side arm 13 to communicate with the central slot 15.

The card ejecting device 3 comprises an ejecting member 31, an operation member 32 and a shaft 33. A vertical passageway 133 extends rearward from a front end of the holding section 14 and also defines a horizontal passageway 132 on an outer surface of the side arm 13.

The ejecting member 31 is made by stamping a metal sheet and comprises an elongated body portion 310 which is inserted into the vertical passageway 133 and attached to the side arm 13. A first, second and third bending portions 311, 312, 313 are respectively formed on a front, middle and rear portions of an upper edge of the body portion 310 and extend inwardly. A blocking portion 314 extends downward from the third bending portion 313. A first and a second sliding portions 315, 316 are respectively formed on the front and rear portions of a lower edge of the body portion 310 and extend upwardly. The first, second and third bending portions 311, 312, 313 are received in the horizontal passageway 132 and the first and second sliding portions 315, 316 are received in an open slot 135 defined on the bottom of the side arm 13.

Figure 4:
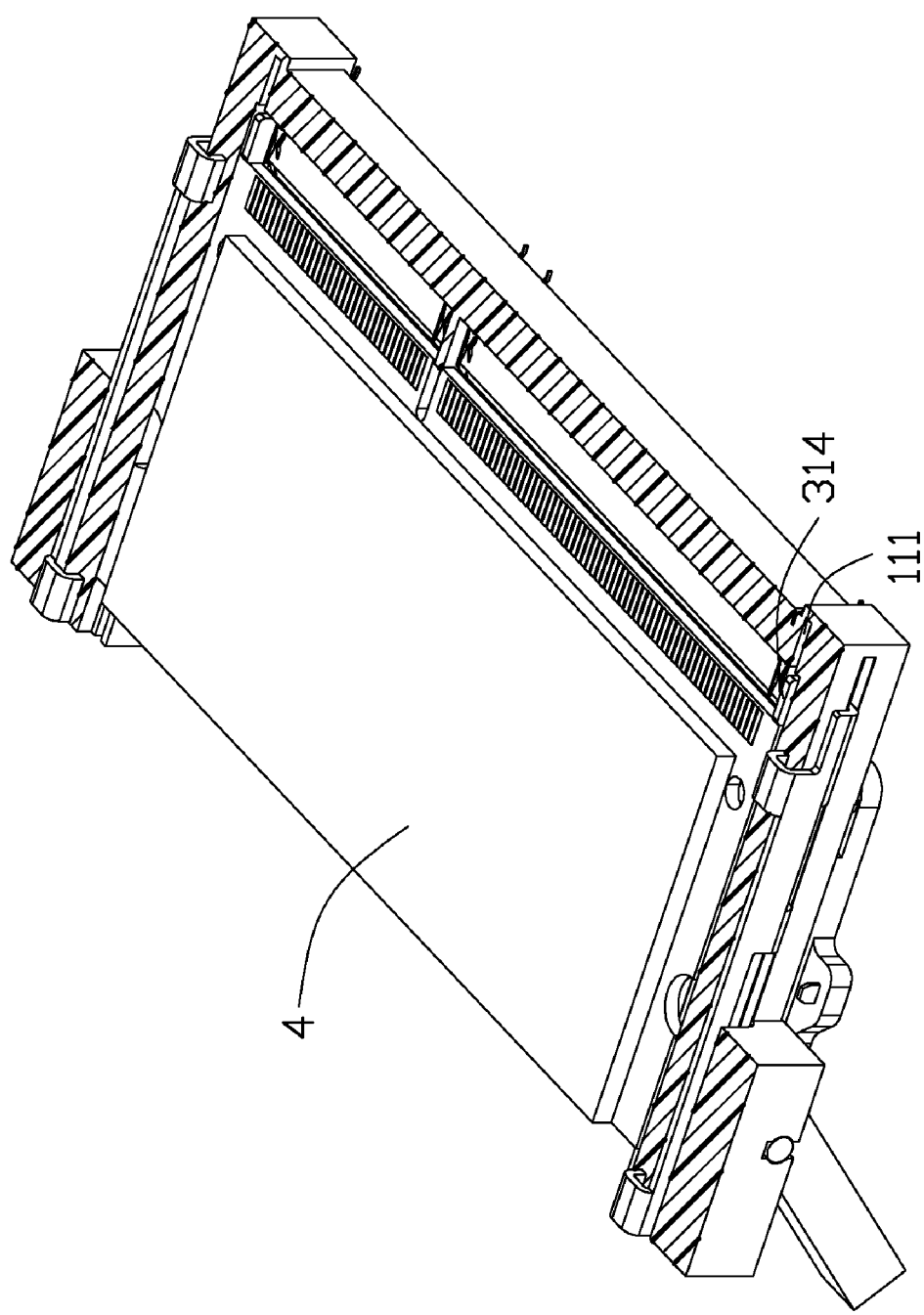
FIG. 4 is a cross-sectional view of the card edge connector stacked with the second card edge connector shown in FIG. 3 along line 4-4, wherein a card ejecting device is in a first position.
Figure 5:
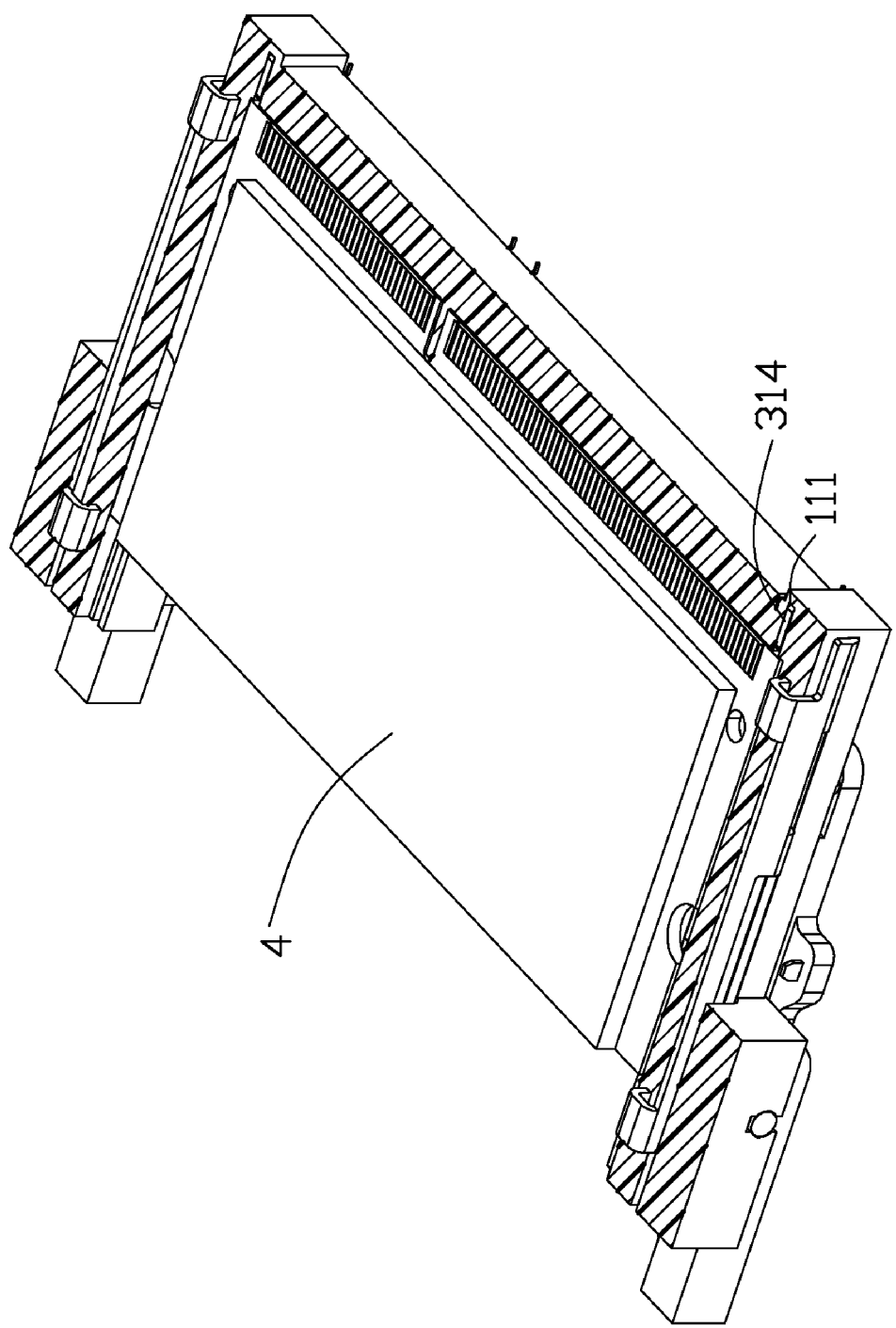
FIG. 5 is a cross-sectional view comparing with FIG. 4, illustrating the card ejecting device in a second position.
Figure 7:
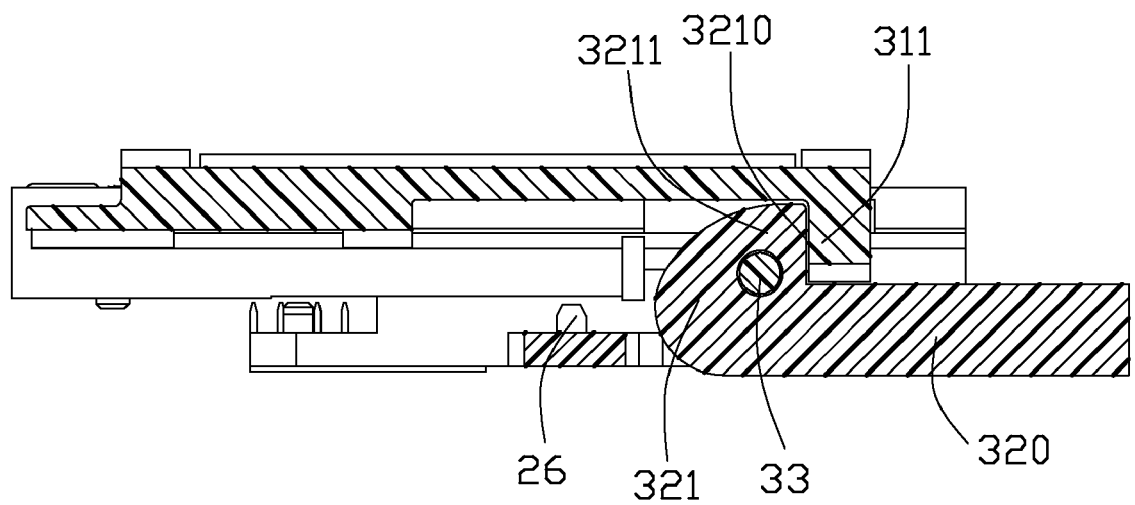
FIG. 7 is a cross-sectional view comparing with FIG. 6, illustrating the card ejecting device in the second position.

The operation member 32 is configured as an L-shaped and comprises an operation portion 320 and a cam portion 321 connecting with the operation portion 320. The cam portion 321 defines a through hole 322 thereon for assembling the shaft 33 therein. After the ejecting device 31 is assembled on the side arm 13, the operation member 32 is put into the receiving room 145, then the shaft 33 is inserted into the channel 146 and the through hole 322 of the cam portion 321 thereby securing the operation member 32 in the receiving room 145. The operation member 32 rotates about the shaft 33 and moves along an up-to-lower direction. Referring to FIG. 4, the blocking portion 314 is received in an aperture 111 defined on an end of the side arm 13 and projects into the central slot 15. Referring to FIG. 7, when the memory module is inserted into the central slot 15, a front face 3210 of the cam 321 abuts against the first bending portion 311 and the operation portion 320 is horizontally located in the holding section 14.

Figure 6:
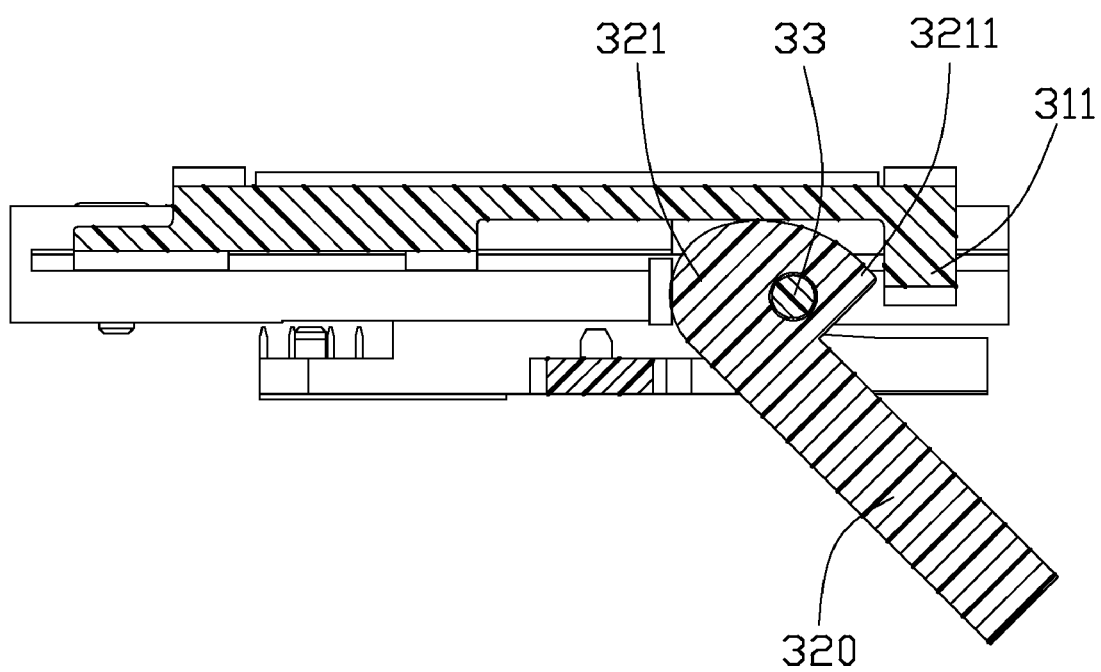
FIG. 6 is a cross-sectional view of the card edge connector stacked with the second card edge connector shown in FIG. 3 along line 6-6, wherein the card ejecting device is in the first position.
Figure 8:
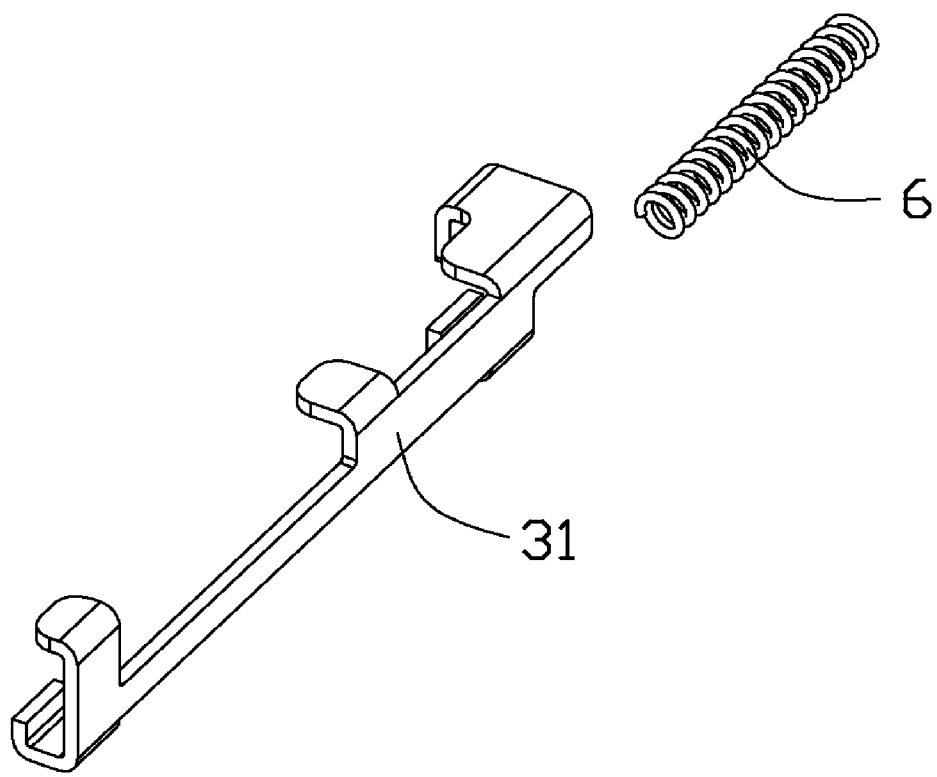
FIG. 8 is a second embodiment of the card ejecting device.

Referring to FIG. 4 to FIG. 7, when the memory module needs to release from the central slot 15, the operation portion 320 rotates from a first position as shown in FIG. 7 to a second position as shown in FIG. 6, i.e. rotates from a horizontal plane where the card edge connector 100 is located to a vertical plane which is perpendicular to the horizontal plane. Accordingly, a protrusion portion 3211 formed on one corner of the cam 321 moves downwardly and pushes the first bending portion 311 moves forwardly from a first position as shown in FIG. 7 to a second position as shown in FIG. 6, which will bring the blocking portion 314 moving out of the aperture 111 and abut against a front end of the memory module, therefore the memory module is released from the central slot 15 freely. When the memory module is inserted into the central slot 15 again, the first bending portion 311 will return to the first position. A front end of the operation portion 320 extends exceeding the side arm 13 for providing an operation space. Referring to FIG. 8, the ejecting member 31 can connect with one end of a spring 6, the other end of which is connected with the insulative housing 1, for returning to the first position.

The card ejecting device 3 works in the vertical plane which is perpendicular to the printed circuit board 5, which will not occupy the space of the printed circuit board 5 and meet the miniaturization trend.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card edge connector for connecting a memory module to a printed circuit board comprising:
   an insulative housing defining a central slot expanding along a transverse direction with a plurality of contacts disposed therein, and a pair of side arms disposed at opposite ends thereof;
   a pair of card ejecting devices assembled on the side arms, each comprising an ejecting member attached to the side arm and an operation member which can rotate in a plane perpendicular to the card edge connector;
   wherein the ejecting member comprises a block portion projecting into the central slot and moving along a front-to-rear direction perpendicular to the transverse direction by the urging of the operation member;
   wherein the ejecting member comprises a bending portion opposite to the block portion for cooperating with the operation member;
   wherein the operation member comprises an operation portion and a cam portion perpendicular to the operation portion, the bending portion is located in front of the cam portion in the front-to-rear direction;
   wherein the cam portion defines a through hole therein in which a shaft is inserted and maintain the operation member in the corresponding side arm;
   wherein each side arm forms a holding portion at a distal end thereof, the holding portion defines a receiving room for receiving the operation member and a transverse passageway across the receiving room for receiving said shaft.

2. The card edge connector assembly as claimed in claim 1, wherein the operation member is distantly located in front of the central slot in the front-to-rear direction.

3. The card edge connector as described in claim 1, wherein the holding portion projecting laterally from each side arm and defines a longitudinal slot for receiving the ejecting member.

4. The card edge connector as described in claim 3, wherein the ejecting portion comprises an elongated body portion attached to an outer surface of each side arm.

5. A card edge connector comprising:
   an insulative housing defining a central slot expanding along a transverse direction with a plurality of contacts disposed therein, and a pair of side arms disposed at opposite ends thereof;
   a card ejecting device comprising an ejecting member having a blocking portion adjacent to the central slot and a bending portion far away from the central slot, and an operation member discrete from the ejecting member and having an operation portion and a cam portion extending from the operation portion and located behind the bending portion in a front-to-rear direction perpendicular to the transverse direction;
   wherein the cam portion urges the bending portion to move along said front-to-rear direction so as to drive the blocking portion moving away from the central slot.

6. The card edge connector as described in claim 5, wherein each side arm forms a holding portion at a distal end thereof, the holding portion defines a receiving room for receiving the operation member and a transverse passageway across the receiving room for receiving a shaft.

7. The card edge connector assembly as claimed in claim 5, wherein the operation member is distantly located in front of the central slot in the front-to-rear direction.

8. The card edge connector as described in claim 5, wherein the operation portion rotates in a vertical plane perpendicular to the card edge connector.

9. The card edge connector as described in claim 8, wherein the operation portion extends exceeding the side arm in the front-to-rear direction.

10. A card edge connector assembly comprising:
an insulative housing defining a horizontal receiving slot for receiving a card therein; a plurality of contacts disposed in the housing beside said receiving slot for engagement with the card;
a card ejecting device assembled to the housing and including an ejecting member back and forth linearly moveable relative to the housing in a front-to-back direction for ejecting the corresponding card from the receiving slot, said ejecting member is equipped with a spring to urge said ejecting member back to a locking position; and
an operation member movable relative to the housing in a rotational manner about a pivot extending along a direction perpendicular to said front-to-back direction to drive said ejecting member to move, wherein said direction is parallel to a direction along which said horizontal receiving slot extends.

11. The card edge connector assembly as claimed in claim 10, wherein the receiving slot is configured to have the corresponding card adapted to be assembled into the receiving slot along the front-to-back direction.

12. The card edge connector assembly as claimed in claim 10, wherein the ejecting member and the operation member are discrete from each other.

13. The card edge connector assembly as claimed in claim 10, wherein the operation member is distantly located in front of the receiving slot in the front-to-back direction.

14. The card edge connector assembly as claimed in claim 10, wherein the operation member is located on a front portion of the housing, and the ejecting member includes a blocking portion located on a rear portion of the housing for ejecting the corresponding card from the receiving slot.

15. The card edge connector assembly as claimed in claim 14, wherein the ejecting member comprises a bending portion opposite to the block portion for cooperating with the operation member.

16. The card edge connector assembly as claimed in claim 15, wherein the operation member comprises an operation portion and a cam portion perpendicular to the operation portion, the bending portion is located in front of the cam portion in the front-to-rear direction.

17. The card edge connector assembly as claimed in claim 16, wherein the housing forms a holding portion at a distal end thereof, the holding portion defines a receiving room for receiving the operation member and a transverse passageway across the receiving room for receiving said pivot.

* * * * *